(12) United States Patent
Ota

(10) Patent No.: US 11,733,625 B2
(45) Date of Patent: Aug. 22, 2023

(54) IMAGE FORMING APPARATUS

(71) Applicant: TOSHIBA TEC KABUSHIKI KAISHA, Tokyo (JP)

(72) Inventor: Hiroshi Ota, Ota Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/571,187

(22) Filed: Jan. 7, 2022

(65) Prior Publication Data

US 2022/0365467 A1 Nov. 17, 2022

(30) Foreign Application Priority Data

May 11, 2021 (JP) ................ 2021-080273

(51) Int. Cl.
  *G06F 3/12* (2006.01)
  *G03G 15/20* (2006.01)
  *G06K 15/12* (2006.01)
  *G06K 15/02* (2006.01)

(52) U.S. Cl.
  CPC ..... *G03G 15/2039* (2013.01); *G03G 15/2064* (2013.01); *G06K 15/12* (2013.01); *G06K 15/1809* (2013.01)

(58) Field of Classification Search
  CPC ........... G03G 15/2039; G03G 15/2064; G06K 15/12; G06K 15/18
  See application file for complete search history.

(56) References Cited

U.S. PATENT DOCUMENTS

| 2002/0003970 | A1* | 1/2002 | Goto ................. G03G 15/2039 399/69 |
| 2004/0028423 | A1* | 2/2004 | Hashiguchi ........ G03G 15/2042 399/69 |
| 2005/0152709 | A1* | 7/2005 | Osaki ................. G03G 15/2064 399/81 |
| 2009/0263151 | A1* | 10/2009 | Deguchi ............ G03G 15/2039 399/70 |
| 2012/0121306 | A1* | 5/2012 | Shimura .............. H05B 3/0095 399/329 |

(Continued)

FOREIGN PATENT DOCUMENTS

| JP | 2006-242982 A | 9/2006 |
| JP | 2006-242983 A | 9/2006 |

(Continued)

OTHER PUBLICATIONS

Extended European Search Report dated Aug. 12, 2022 in corresponding European Patent Application No. 22160399.6, 7 pages.

*Primary Examiner* — Huo Long Chen
(74) *Attorney, Agent, or Firm* — Kim & Stewart LLP

(57) ABSTRACT

According to an embodiment, an image forming apparatus measures a temperature of a pressing member and controls heat generation of a heater such that the measured temperature approaches a control temperature. Further, the image forming apparatus sets, before starting image formation of one job including image formation, one candidate temperature of a plurality of predetermined candidate temperatures different from each other as the control temperature on the basis of the number of sheets to be used and a sheet size to be used in the image formation of the one job.

12 Claims, 11 Drawing Sheets

(56) References Cited

U.S. PATENT DOCUMENTS

| | | |
|---|---|---|
| 2015/0309456 A1 | 10/2015 | Sato |
| 2017/0068191 A1 | 3/2017 | Ueno |
| 2020/0159150 A1* | 5/2020 | Sakai .................... G03G 15/55 |

FOREIGN PATENT DOCUMENTS

| | | |
|---|---|---|
| JP | 2010-097111 A | 4/2010 |
| JP | 2020-003603 A | 1/2020 |
| JP | 2020-074050 A | 5/2020 |

* cited by examiner

IMAGE FORMING APPARATUS

CROSS-REFERENCE TO RELATED APPLICATIONS

This application is based upon and claims the benefit of priority from the prior Japanese Patent Application No. 2021-080273, filed on May 11, 2021, the entire contents of which are incorporated herein by reference.

FIELD

An embodiment described herein generally relates to an image forming apparatus.

BACKGROUND

For example, in an electrophotographic image forming apparatus, a heated roller is used to fix a developer attached to the paper. If the pressure applied to the sheet and the developer is reduced by the roller, there is a possibility that a fixing failure occurs. In view of such circumstances, it has been desired to reduce the possibility of occurrence of a fixing failure.

DETAILED DESCRIPTION

Figure 1:
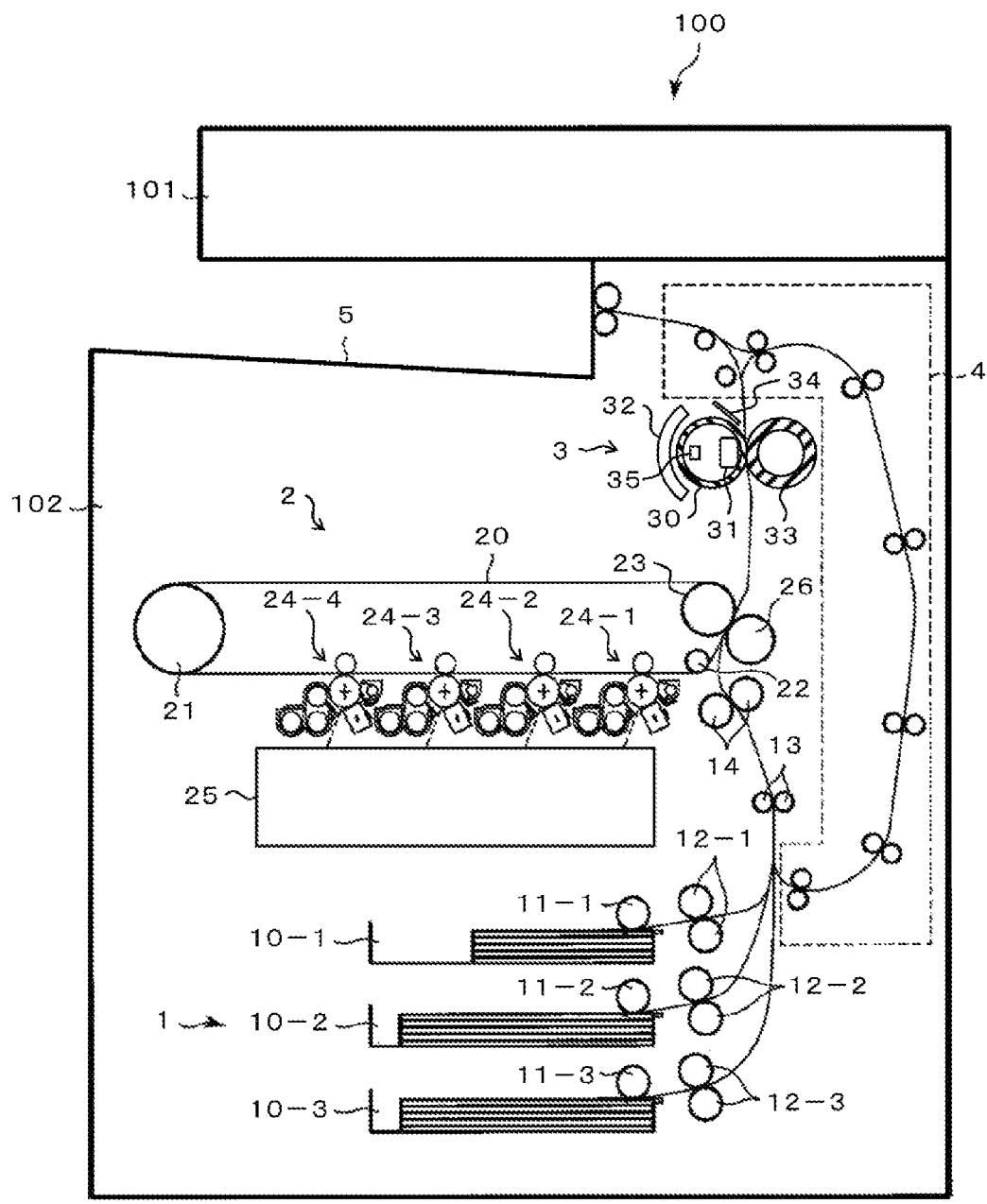
FIG. 1 is a diagram schematically showing a mechanical configuration of a multi-function peripheral (MFP) according to an embodiment.

According to one embodiment, an image forming apparatus forms an image on a sheet and fixes the formed image onto the sheet to perform image formation. The image forming apparatus includes a heater, a pressing member, a temperature sensor, a fixing controller, and a processor. The heater generates heat to heat the sheet over an entire region in a direction perpendicular to a conveyance direction of the sheet to fix the image onto the sheet conveyed after the image is formed on the sheet. The pressing member applies a pressure for fixing to the sheet heated by the heater over the entire region in the direction perpendicular to the conveyance direction. The temperature sensor measures a temperature of the pressing member or a temperature near the pressing member. The fixing controller controls heat generation of the heater such that the temperature measured by the temperature sensor approaches a control temperature. The processor sets, before starting image formation of one job including the image formation, one candidate temperature of a plurality of predetermined candidate temperatures different from each other as the control temperature on the basis of the number of sheets to be used and a sheet size to be used in the image formation of the one job.

Hereinafter, an embodiment will be described with reference to the drawings. The same reference symbols in the drawings will denote the same or similar portions. Note that a multi-function peripheral (MFP) will be exemplified as an image forming apparatus in the following embodiment. Contents of various operations and various processes to be described below are examples, and it is possible to change the order of some operations and processes, omit some operations and processes, or add other operations and processes as appropriate.

First, the configuration of the MFP according to this embodiment will be described. FIG. 1 is a diagram schematically showing a mechanical configuration of an MFP 100 according to the embodiment. As shown in FIG. 1, the MFP 100 includes a scanner 101 and a printer 102.

The scanner 101 reads an image of a document and generates image data corresponding to the document. The scanner 101 uses, for example, an image sensor such as a charge-coupled device (CCD) line sensor to generate image data corresponding to the reflected light image from the reading surface of the document. The scanner 101 scans a document placed on a document table by the image sensor that moves along the document. The scanner 101 further scans a document conveyed by an auto document feeder (ADF) by a fixed image sensor.

The printer 102 forms an image on a medium on which an image is to be formed by an electrophotographic method. The medium is typically a print sheet such as cut paper. In the following description, it is assumed that a print sheet is used as a medium. However, as the medium, a sheet material made of paper different from the cut paper may be used, or a sheet material made of a material such as a resin other than paper may be used. The printer 102 has a color printing function of printing a color image on a print sheet and a monochrome printing function of printing a monochrome image on a print sheet. The printer 102 forms a color image by superimposing element images using developers including, for example, three colors of yellow, magenta, and cyan or four colors of those three colors and black. Further, the printer 102 forms a monochrome image using, for example, a developer of black. The developer is, for example, a toner. The developer may include, for example, a toner and a carrier. However, the printer 102 may include only one of the color printing function and the monochrome printing function.

In the exemplary configuration shown in FIG. 1, the printer 102 includes a paper feeding unit 1, a print engine 2, a fixing unit 3, an automatic double-sided unit (ADU) 4, and a paper receiving tray 5. The paper feeding unit 1 includes paper feeding cassettes 10-1, 10-2, and 10-3, pick-up rollers 11-1, 11-2, and 11-3, conveyance rollers 12-1, 12-2, and 12-3, conveyance rollers 13, and resist rollers 14.

The paper feeding cassettes 10-1, 10-2, and 10-3 store print sheets in a stacked state. The print sheets stored in the paper feeding cassettes 10-1, 10-2, and 10-3 may be of different types of print sheets having different sizes and materials or may be of the same type of print sheets. In addition, the paper feeding unit 1 may include a manual paper feed tray. The pick-up rollers 11-1, 11-2, and 11-3 take out print sheets one by one from the respective paper feeding cassettes 10-1, 10-2, and 10-3. The pick-up rollers 11-1, 11-2, and 11-3 feed the taken out print sheets to the respective conveyance rollers 12-1, 12-2, and 12-3. The conveyance rollers 12-1, 12-2, and 12-3 feed the print sheets fed from the respective pick-up rollers 11-1, 11-2, and 11-3 to the conveyance rollers 13 via a conveyance path formed by a guide member (not shown).

The conveyance rollers 13 further convey the print sheets fed from any one of the conveyance rollers 12-1, 12-2, and 12-3 and feed the print sheets to the resist rollers 14.

The resist rollers 14 correct the inclination of the print sheet. The resist rollers 14 adjust the timing at which the print sheet is fed to the print engine 2. The paper feeding cassettes, the pick-up rollers, and the conveyance rollers are not limited to being in three sets, and any number of sets may be provided. Further, if a manual paper feed tray is provided, the paper feeding cassettes, and the pick-up rollers and conveyance rollers paired with the paper feeding cassettes need not be provided.

The print engine 2 includes a transfer belt 20, support rollers 21, 22, and 23, image forming units 24-1, 24-2, 24-3, and 24-4, an exposure unit 25, and a transfer roller 26. The transfer belt 20 is an endless belt and is supported by the support rollers 21, 22, and 23 so as to maintain the state shown in FIG. 1. The transfer belt 20 rotates counterclockwise in FIG. 1 with the rotation of the support roller 21. The transfer belt 20 temporarily carries an image of a developer to be formed on the print sheet on the outer surface (hereinafter, referred to as an image carrying surface). For example, semiconductive polyimide is used for the transfer belt 20 in terms of heat resistance and abrasion resistance. So-called sub-scanning is achieved by the movement of the image carrying surface with the rotation of the transfer belt 20. The moving direction of the image carrying surface is also referred to as a sub-scanning direction.

The image forming units 24-1 to 24-4 each include a photoreceptor, a charger, a developing unit, a primary transfer roller, and a cleaner, and each have a well-known structure for performing image formation in an electrophotographic method in cooperation with the exposure unit 25. The image forming units 24-1 to 24-4 are arranged along the transfer belt 20 in a state in which the axial directions of the respective photoreceptors are parallel to each other. The image forming units 24-1 to 24-4 are different from each other only in the colors of developers used and have the same structures and operations. The photoreceptors of the image forming units 24-1 to 24-4 are uniformly charged by the charger. After the charging, the photoreceptors of the image forming units 24-1 to 24-4 are exposed by the exposure unit 25, and thus electrostatic latent images corresponding to the colors of the developers are formed. The image forming unit 24-1 develops an electrostatic latent image by the developing unit using, for example, a black developer and forms an element image (image of black developer) on the photoreceptor. The image forming unit 24-2 develops an electrostatic latent image by the developing unit using, for example, a cyan developer and forms an element image (image of cyan developer) on the photoreceptor. The image forming unit 24-3 develops an electrostatic latent image by the developing unit using, for example, a magenta developer and forms an element image (image of magenta developer) on the photoreceptor. The image forming unit 24-4 develops an electrostatic latent image by the developing unit using, for example, a yellow developer and forms an element image (image of yellow developer) on the photoreceptor. The image forming units 24-1 to 24-4 transfer the element images of the respective colors from the respective photoreceptors onto the image carrying surface of the transfer belt 20 by the primary transfer rollers so as to overlap each other. Thus, the image forming units 24-1 to 24-4 form a color image in which the element images of the respective colors are superimposed on the image carrying surface of the transfer belt 20 at the time at which the transfer belt 20 passes through the image forming unit 24-1. Note that a developer container for storing the developers of the respective colors is disposed in a space above the transfer belt 20, for example, though not shown in the figure.

The exposure unit 25 exposes the photoreceptors of the respective image forming units 24-1 to 24-4 in accordance with the image data representing the element images of the respective colors to form electrostatic latent images on the photoreceptors as described above. As the exposure unit 25, a laser scanner, a light emitting diode (LED) head, or the like is used. If a laser scanner is used as the exposure unit 25, the exposure unit 25 includes, for example, a semiconductor laser element, a polygon mirror, an imaging lens system, and a mirror. In this case, for example, the exposure unit 25 selectively causes a laser beam emitted from the semiconductor laser element in accordance with the image data to enter each of the photoreceptors of the image forming units 24-1 to 24-4 by switching the emission direction using the mirror. Further, the exposure unit 25 scans the laser beam in an axial direction (depth direction in FIG. 1) of the photoreceptor using the polygon mirror. The scanning of the laser beam is so-called main scanning. Its direction is called a main scanning direction.

The transfer roller 26 (secondary transfer roller) is disposed in parallel with the support roller 23 and sandwiches the transfer belt 20 together with the support roller 23. The transfer roller 26 sandwiches the print sheet fed from the resist rollers 14 together with the image carrying surface of the transfer belt 20. The transfer roller 26 transfers the developer image formed on the image carrying surface of the transfer belt 20 to the print sheet using an electrostatic force. In other words, the support roller 23 and the transfer roller 26 constitute a transfer unit (transfer device). The developer may remain on the image carrying surface of the transfer belt 20 without being completely transferred to the print sheet. Therefore, the developer adhering to the image carrying surface of the transfer belt 20 after passing between the support roller 23 and the transfer roller 26 is removed by the cleaner (not shown) before reaching the image forming unit 24-4. In such a manner, the print engine 2 forms an image (developer image) on the print sheet fed by the resist rollers 14 by the electrophotographic method.

The fixing unit 3 presses the developer adhering as an image of the developer to the print sheet fed from the print engine 2 while melting the developer, to fix the developer onto the print sheet. As shown in FIG. 1, the fixing unit 3 includes a fixing belt 30, a pressing pad 31, a heater 32, a press roller 33, a separation plate 34, and a temperature sensor 35. Note that the fixing belt 30 and the press roller 33 are shown in cross sections on a plane perpendicular to the rotation axis.

The fixing belt 30 is, for example, an endless belt made of a heat-resistant resin. The fixing belt 30 is supported by a support mechanism (not shown) so as to rotate about a rotation axis extending in the depth direction in FIG. 1. The length of the fixing belt 30 in the rotation axis direction is longer than the maximum value of the length (hereinafter, referred to as width) of the print sheet in a direction (depth direction in FIG. 1) perpendicular to a print sheet conveyance direction (vertical direction in FIG. 1). The outer diameter of the fixing belt 30 is typically smaller than the length in the rotation axis direction. Therefore, the rotation axis direction is the longitudinal direction of the fixing belt 30. The fixing belt 30 is heated by the heater 32 to heat the print sheet and the developer adhering to the print sheet. The pressing pad 31 is provided so as to come into contact with the inner surface of the fixing belt 30, and presses the fixing belt 30 to the press roller 33.

The heater 32 generates heat to heat the fixing belt 30. The heater 32 is, for example, an induction heating (IH) heater, but any other types of heater can be used as appropriate. The heater 32 may include only one heating element or may include a plurality of heating elements arranged side by side in the rotation axis direction. In such a manner, the heater 32 generates heat to heat the print sheet through the fixing belt 30. The heater 32 is an exemplary heat generation unit.

The press roller 33 is provided in parallel to the fixing belt 30. The press roller 33 is supported by a support mechanism (not shown) so as to rotate about the rotation axis extending in the depth direction in FIG. 1. The length of the press roller 33 in the rotation axis direction is longer than the maximum width of the print sheet. The outer diameter of the press roller 33 is typically smaller than the length in the rotation axis direction. Therefore, the rotation axis direction is the longitudinal direction of the press roller 33. The press roller 33 sends the print sheet fed from the print engine 2 to the ADU 4 together with the fixing belt 30 while sandwiching the print sheet between the press roller 33 and the fixing belt 30. In such a manner, the press roller 33 presses the print sheet when the print sheet is sandwiched between the press roller 33 and the fixing belt 30 together with the pressing pad 31. In other words, the cooperation of the fixing belt 30, the pressing pad 31, and the press roller 33 provides the function as a pressing member. Note that the press roller 33 is also heated by the heat of the fixing belt and operates as part of the function of heating the developer adhering to the print sheet. Although the function of the fixing unit 3 as the pressing member is implemented by the above-mentioned configuration, the fixing unit 3 is not limited to the above-mentioned configuration and only needs to be capable of pressing the print sheet. For example, a common roller may be used instead of the fixing belt 30 and the pressing pad 31, and the function as a pressing member may be implemented when at least one of such a roller or the press roller 33 is pressed in the direction of the other roller. Alternatively, for example, instead of the press roller 33, the function as a pressing member may be implemented by providing a structure similar to the fixing belt 30 and the pressing pad 31. Furthermore, for example, the function as a pressing member may be implemented by a roller and a fixing plate being in contact with each other when a structure in which the print sheet is caused to pass between the roller and the fixing plate is provided. Instead of heating the fixing belt 30 and the press roller 33, other various forms can also be appropriately adopted in heating the print sheet. For example, the fixing unit 3 may include a heater that directly heats the press roller 33 instead of the heater 32 or in addition to the heater 32. Alternatively, the fixing unit 3 may include a heater that directly heats the print sheet before the print sheet is sandwiched between the fixing belt 30 and the press roller 33, for example, instead of the heater 32 or in addition to the heater 32. In those cases, a heater provided instead of the heater 32 or in addition to the heater 32 also corresponds to the heat generation unit.

The separation plate 34 separates the print sheet passing between the fixing belt 30 and the press roller 33 from the fixing belt 30, and prevents the print sheet from being caught in the fixing belt 30. The temperature sensor 35 measures the temperature of the fixing belt 30. The temperature sensor 35 is typically disposed to measure the temperature near the center of the fixing belt 30 in the longitudinal direction. The temperature sensor 35 is an example of a detection unit. However, the temperature sensor may be provided in any manner if it can measure the temperature of the fixing belt 30. The temperature sensor 35 may be provided so as to measure the temperature of the heater 32, the temperature of the press roller 33, or the temperature of the periphery of the fixing belt 30 or the press roller 33. In other words, the detection unit may be achieved so as to directly detect the temperature of the pressing member or indirectly detect the temperature of the pressing member.

The ADU 4 includes a plurality of rollers and selectively performs the following two operations. In the first operation, the print sheet having passed through the fixing unit 3 is directly sent to the paper receiving tray 5. The first operation is performed when single-sided printing or double-sided printing is completed. In the second operation, after the print sheet having passed through the fixing unit 3 is once conveyed to the paper receiving tray 5, the print sheet is switched back and sent to the print engine 2. The second operation is performed when printing (image formation) on only one side in the double-sided printing is completed. The paper receiving tray 5 receives the print sheet discharged after the image is formed thereon.

Figure 2:
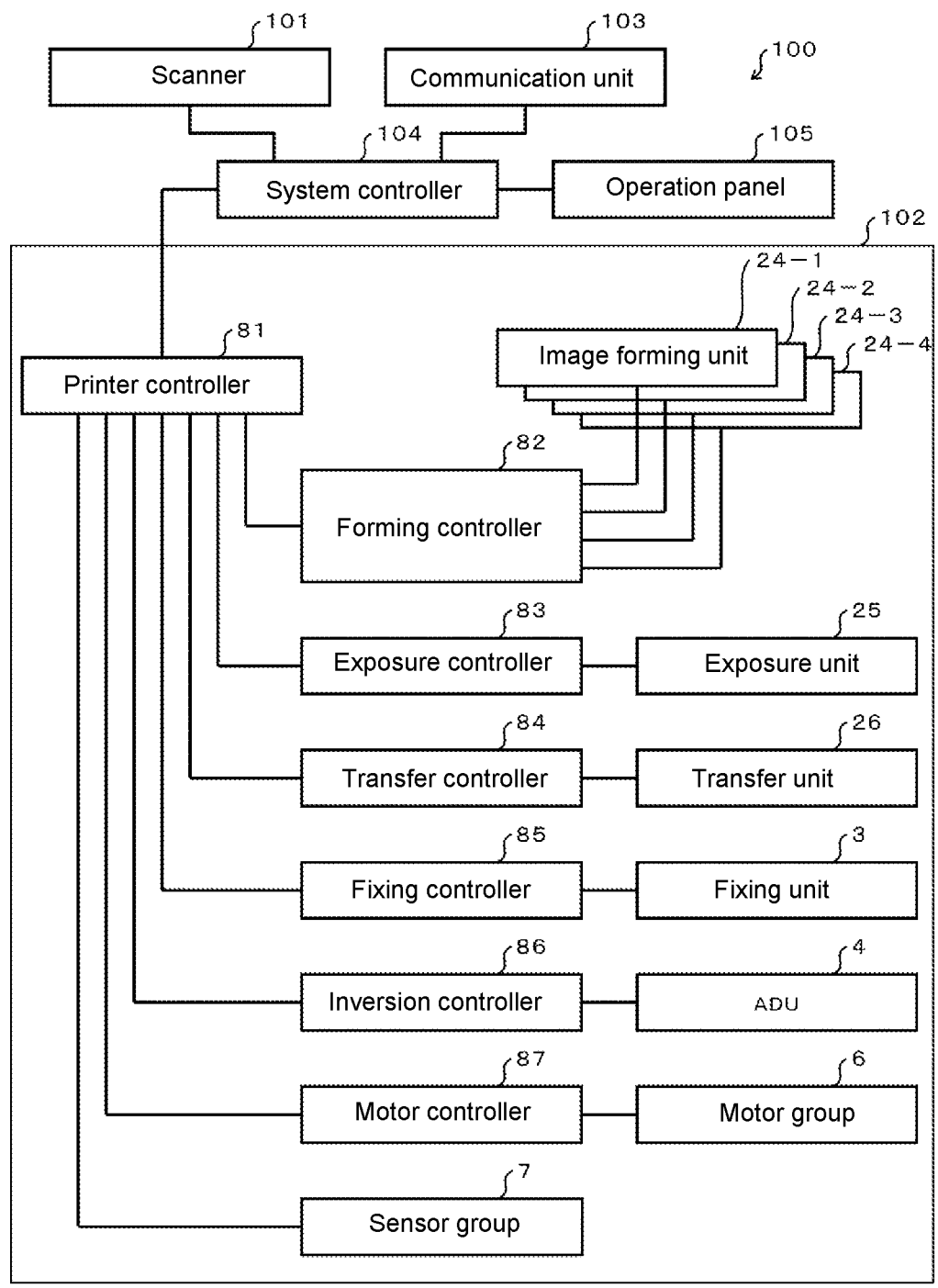
FIG. 2 is a block diagram schematically showing a configuration related to the control of the MFP according to the embodiment.

FIG. 2 is a block diagram schematically showing a configuration relating to the control of the MFP 100. In FIG. 2, the same elements as those shown in FIG. 1 will be denoted by the same reference numerals, and detailed description thereof will be omitted. In addition to the scanner 101 and the printer 102, the MFP 100 includes a communication unit 103, a system controller 104, and an operation panel 105.

The communication unit 103 performs processing for communicating with an information terminal such as a computer device and an image terminal such as a facsimile device through a communication network such as a local area network (LAN) or a public communication network. The system controller 104 integrally controls the units constituting the MFP 100 in order to achieve a desired operation to serve as the MFP 100. Note that the desired operation to serve as the MFP 100 is, for example, an operation for achieving various functions implemented by conventional MFPs. The operation panel 105 includes an input device and a display device. The operation panel 105 inputs an instruction by an operator through the input device. The operation panel 105 displays various types of information to be notified to the operator by the display device. For example, a touch panel can be used as the operation panel 105.

The above-mentioned fixing unit 3, ADU 4, image forming units 24-1 to 24-4, exposure unit 25, and transfer roller 26 of the printer 102 are elements to be controlled. In addition to those elements, the printer 102 includes a motor group 6 as an element to be controlled. The motor group 6 includes a plurality of motors for rotating at least one of the pick-up rollers 11-1, 11-2, and 11-3, the conveyance rollers 12-1, 12-2, and 12-3, the conveyance rollers 13, the resist rollers 14, the support roller 21, the transfer roller 26, the fixing belt 30, or the press roller 33, and further a roller or the like included in the ADU 4.

The printer 102 further includes a sensor group 7, a printer controller 81, a forming controller 82, an exposure controller 83, a transfer controller 84, a fixing controller 85, an inversion controller 86, and a motor controller 87. The sensor group 7 includes various sensors for monitoring the operating state of the apparatus. The printer controller 81 collectively controls the units constituting the printer 102 in order to achieve a desired operation to serve as the printer 102 under the control of the system controller 104.

The forming controller 82, the exposure controller 83, the transfer controller 84, the fixing controller 85, the inversion controller 86, and the motor controller 87 all operate under the control of the printer controller 81 to control the operations of the image forming units 24-1 to 24-4, the exposure unit 25, the transfer roller 26, the ADU 4, and the motor group 6. Note that the fixing controller 85 has a function of controlling the heat generation of the heater 32 such that the temperature measured by the temperature sensor 35 approaches the fixing control temperature (hereinafter, simply referred to as control temperature) by adjusting the driving power supplied to the heater 32, for example. However, the fixing controller 85 collectively controls the entire heater 32. In other words, the fixing controller 85 does not have a function of controlling the temperature of the heater 32 individually in each of the plurality of regions of the fixing belt 30 in the longitudinal direction. In other words, the fixing controller 85 has a function as a control unit.

Figure 3:
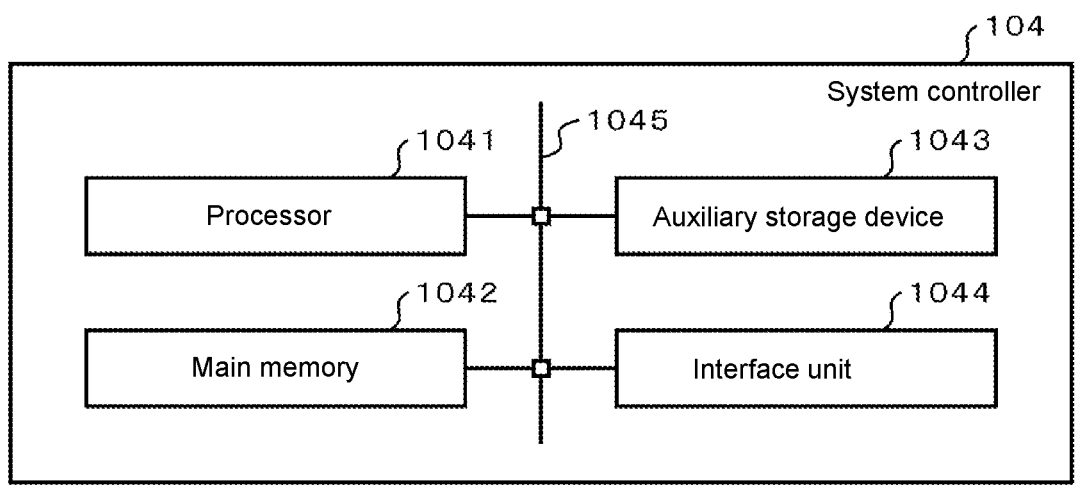
FIG. 3 is a block diagram showing a main circuit configuration of a system controller according to the embodiment.

FIG. 3 is a block diagram showing a circuit configuration of a main part of the system controller 104. The system controller 104 includes a processor 1041, a main memory 1042, an auxiliary storage device 1043, an interface unit 1044, and a transmission line 1045.

The processor 1041, the main memory 1042, and the auxiliary storage device 1043 are connected to each other through the transmission line 1045, so that a computer that performs information processing for the control described above is configured. The processor 1041 corresponds to the central portion of the computer. The processor 1041 executes information processing to be described later in accordance with an operating system, middleware, and an information processing program such as an application program.

The main memory 1042 corresponds to the main memory portion of the computer. The main memory 1042 includes a non-volatile memory area and a volatile memory area. The main memory 1042 stores an information processing program in the non-volatile memory area. The main memory 1042 may also store, in the non-volatile or volatile memory area, data necessary for the processor 1041 to perform processing for controlling each unit. The volatile memory area of the main memory 1042 is used by the processor 1041 as a work area in which data is appropriately rewritten.

The auxiliary storage device 1043 corresponds to the auxiliary storage portion of the computer. As the auxiliary storage device 1043, for example, well-known storage devices such as an electric erasable programmable read-only memory (EEPROM), a hard disc drive (HDD), and a solid state drive (SSD) can be used alone or in combination. The auxiliary storage device 1043 stores data used by the processor 1041 to perform various types of processing and data generated by the processing of the processor 1041. The auxiliary storage device 1043 stores, for example, data of a plurality of candidate temperatures of the control temperature. The data of the plurality of candidate temperatures is data of a predetermined temperature and includes, for example, data of an increased temperature (first candidate temperature) and a standard temperature (second candidate temperature) to be described later. Further, the auxiliary storage device 1043 stores, for example, a plurality of candidate speeds of a print speed (image forming speed) to be described later. The data of the plurality of candidate speeds is data of a predetermined speed and includes, for example, data of a reduced speed (first candidate speed) and a standard speed (second candidate speed) to be described later. The auxiliary storage device 1043 also stores an information processing program.

The interface unit 1044 performs well-known processing for exchanging data between the scanner 101, the printer 102, the communication unit 103, the system controller 104, and the operation panel 105. As the interface unit 1044, a well-known interface device, communication device, or the like can be used alone or in combination. The transmission line 1045 includes an address bus, a data bus, a control signal line, and the like, and transmits data and control signals exchanged between the connected units.

Next, the operation of the MFP 100 configured as described above will be described. In the following description, an operation different from that of a well-known MFP will be mainly described, and description of other operations will be omitted.

The processor 1041 of the system controller 104 executes information processing for controlling the printer 102 (hereinafter, referred to as print control processing) in accordance with an application program when the start of a job such as copying accompanied by printing (image forming) by the printer 102 is requested. In the following, the requested job will be referred to as a target job.

Figure 4:
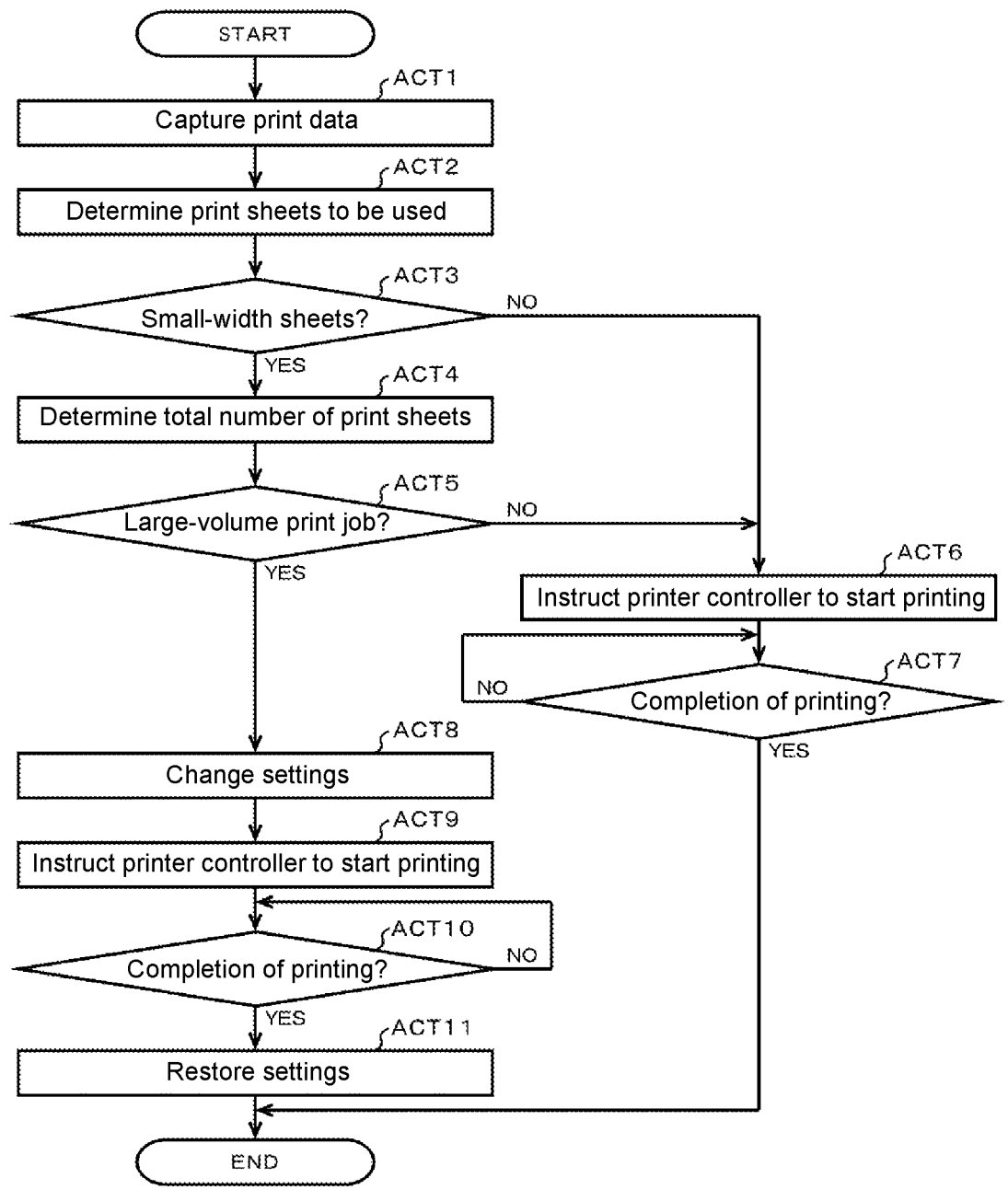
FIG. 4 is a flowchart showing print control processing by a processor according to the embodiment.

FIG. 4 is a flowchart of the print control processing by the processor 1041. In ACT1, the processor 1041 captures print data. For example, if a target job (job accompanied by printing) is copying, the processor 1041 causes the scanner 101 to read a document and captures the generated print data from the scanner 101. For example, if the target job (job accompanied by printing) is network printing or facsimile reception, the processor 1041 also causes the communication unit 103 to receive print data. Note that the processor 1041 acquires all the print data to be printed in the target job.

In ACT2, the processor 1041 determines print sheets to be used. For example, if the automatic selection of sheets is designated, the processor 1041 determines the size of the document represented by the print data acquired in ACT1. The processor 1041 sets the print sheets suitable to print the document of the determined size as the print sheets to be used. For example, if an operation of an operator who designates the print sheets to be used is received by the operation panel 105, the processor 1041 sets the designated print sheets as the print sheets to be used.

In ACT3, the processor 1041 checks whether or not the print sheets to be used are print sheets defined as small-width sheets (specified sheets) in advance. Note that, for example, a designer or the like of the MFP 100 may arbitrarily determine which size of the print sheets is to be set as the small-width sheets. For example, the small-width sheets are print sheets having the width narrower than a predetermined width (specified width). However, the small-width sheet is a print sheet in which a temperature difference between a region in which the print sheet contacts (hereinafter, referred to as contact region) and a region in which the print sheet does not contact (hereinafter, referred to as non-contact region) with respect to the longitudinal direction of the press roller 33 (the rotation axis direction of the press roller 33) is large, and a fixing failure occurs due to a difference in the outer diameter of the press roller 33.

Figure 5:
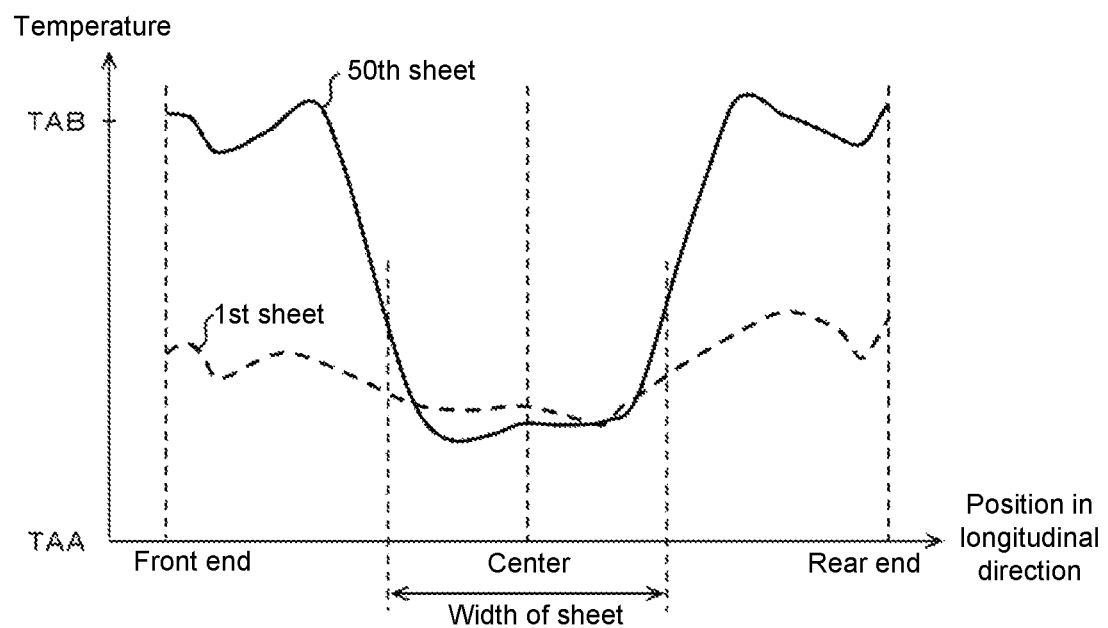
FIG. 5 is a diagram showing the results obtained by measuring the temperature of a fixing belt according to the embodiment at a plurality of positions of the fixing belt in the longitudinal direction.
Figure 6:
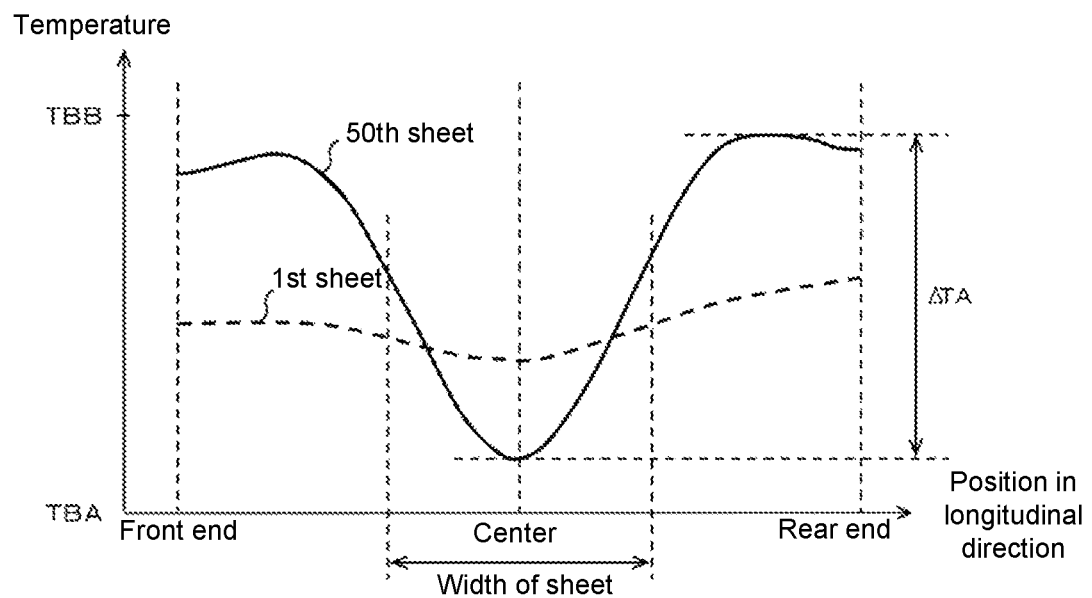
FIG. 6 is a diagram showing the results obtained by measuring the temperature of a press roller according to the embodiment at a plurality of positions of the press roller in the longitudinal direction.

Here, description will be given on a fixing failure due to a difference in the outer diameter of the press roller 33. FIG. 5 is a diagram showing the results obtained by measuring the temperature of the fixing belt 30 at a plurality of positions in the longitudinal direction of the fixing belt (the rotation axis direction of the fixing belt 30). The vertical axis of FIG. 5 represents the temperature of the fixing belt 30. The horizontal axis of FIG. 5 represents the position in the longitudinal direction of the fixing belt 30. The "front end" in the horizontal axis of FIG. 5 represents a position on one end side of the fixing belt 30 in the longitudinal direction, e.g., a position of the end on the near side of FIG. 1. Further, the "center" in the horizontal axis of FIG. 5 represents a position of the center portion of the fixing belt 30 in the longitudinal direction. Further, the "rear end" in the horizontal axis of FIG. 5 represents a position on the other end side of the fixing belt 30 in the longitudinal direction, e.g., a position of the end on the depth side in FIG. 1. FIG. 6 is a diagram showing the results obtained by measuring the temperature of the press roller 33 at a plurality of positions in the longitudinal direction of the press roller 33 (the rotation axis direction of the press roller 33). The vertical axis of FIG. 6 represents the temperature of the press roller 33. The horizontal axis of FIG. 6 represents the position in the longitudinal direction of the press roller 33. The "front end" in the horizontal axis of FIG. 6 represents a position on one end side of the press roller 33 in the longitudinal direction, e.g., a position of the end on the near side of FIG. 1. Further, the "center" in the horizontal axis of FIG. 6 represents a position of the center portion of the press roller 33 in the longitudinal direction. Further, the "rear end" in the horizontal axis of FIG. 6 represents a position on the other end side of the press roller 33 in the longitudinal direction, e.g., a position of the end on the depth side in FIG. 1. Further, "ΔTA" in FIG. 6 represents the maximum temperature difference of the press roller 33. Note that FIGS. 5 and 6 show the results of the temperature measurement at the time of printing in the same job.

In both of FIGS. 5 and 6, the curved line of the broken line represents measured results obtained when the front end of the first print sheet passes between the fixing belt 30 and the press roller 33. Further, in both of FIGS. 5 and 6, the curved line of the solid line represents measured results obtained when the front end of the 50th print sheet passes between the fixing belt 30 and the press roller 33. The width of the print sheet used is approximately ½ the length of the fixing belt 30 and the press roller 33 in the longitudinal direction. The print speed (image forming speed) and the control temperature are a predetermined speed (hereinafter, referred to as standard speed) and a temperature (hereinafter, referred to as standard temperature) as standard values.

As can be seen from FIGS. 5 and 6, as the number of successive print sheets increases, the temperature at the center portions of both the fixing belt 30 and the press roller 33 decreases. This is because the fixing belt 30 and the press roller 33 are deprived of heat by the print sheets due to the contact of the print sheets. The number of successive print sheets means the number of sheets used for printing in succession. The outer diameter of the press roller 33 changes due to thermal expansion, and thus the outer diameter of the center portion in the longitudinal direction is smaller than that of the end in the longitudinal direction. This leads to a decrease in the pressing force against the fixing belt 30 at the center portion of the press roller 33, which may cause a fixing failure at the center portion of the press roller 33.

Such a fixing failure is apt to occur as the width of the print sheet becomes narrower because of the above-mentioned cause. In this regard, for example, the designer of the MFP 100 sets a print sheet of a size in which a fixing failure is problematic as a small-width sheet on the basis of experiments, simulations, empirical rules, and the like. For example, it is assumed that A5-size and ST-R-size print sheets having a width of 150 mm or less are defined as small-width sheets.

In ACT3 of FIG. 4, if it is determined that the print sheet to be used is a small-width sheet (specified sheet) (YES in ACT3 of FIG. 4), the processing of the processor 1041 proceeds to ACT4. In other words, for example, if the width of the sheet to be used is narrower than a predetermined specified width, the processing of the processor 1041 proceeds to ACT4. In ACT4, the processor 1041 determines the total number of print sheets of the target job. The total number of print sheets means the total number of print sheets to be used for printing in the target job. For example, the processor 1041 checks the number of pages of the document represented by the print data acquired in ACT1, and determines the total number of print sheets by multiplying the number of copies included in the print data or the number of separately designated copies by the number of pages.

In ACT5, the processor 1041 checks whether or not the target job of the determined total number of print sheets (see ACT4) corresponds to a large-volume print job in which the number of print sheets is larger than a predetermined number of print sheets (a specified number of print sheets). The processor 1041 determines that the target job corresponds to a large-volume print job when the determined total number of print sheets exceeds a predetermined threshold value. The threshold value is, for example, a predetermined value in consideration of the relationship between the number of print sheets and the occurrence of a fixing failure. Note that what kind of situation is determined to correspond to a large-volume print job, or what kind of processing is specifically used for the determination may be appropriately determined by, for example, a designer of the MFP 100 on the basis of experiments, simulations, empirical rules, and the like. For example, the threshold value may be changed in accordance with the size of the print sheet to be used.

In ACT5 described above, if it is determined that the target job of the determined total number of print sheets does not correspond to a large-scale print job (NO in ACT5), the processing of the processor 1041 proceeds to ACT6. Further, in ACT3 described above, if it is determined that the print sheet to be used is not a small-width sheet (specified sheet) (NO in ACT3), the processing of the processor 1041 proceeds to ACT6. In other words, if the print sheet to be used is not a small-width sheet and if the target job does not correspond to a large-volume print job, the processing of the processor 1041 proceeds to ACT6.

In ACT6, the processor 1041 instructs the printer controller 81 to start printing of the target job on the basis of the captured print data (see ACT1). In response to such an instruction from the system controller 104, the printer controller 81 operates each unit to print the document represented by the print data on the print sheet. This operation may be similar to that performed by a well-known printer. However, the printer controller 81 instructs the fixing controller 85 to set the control temperature in the fixing unit 3 to the standard temperature. Further, the printer controller 81 instructs the forming controller 82, the exposure controller 83, the inversion controller 86, and the motor controller 87 to set the print speed to a predetermined standard speed. Note that the standard temperature is typically determined separately at the time of monochrome printing and at the time of color printing. The standard temperature at the time of color printing is higher than that at the time of monochrome printing. In addition, different standard temperatures may be determined for the case of performing deceleration printing, the case where the print sheet to be used is thick paper, or the like.

In ACT7, the processor 1041 waits for completion of printing of the target job, which has been instructed to start (see ACT6), by determining whether or not the completion of printing has been notified from the printer controller 81. If it is determined that the completion of printing has been notified from the printer controller 81 (YES in ACT7), the processor 1041 terminates the print control processing shown in FIG. 4.

On the other hand, if it is determined in ACT3 that the print sheet to be used is a small-width sheet (specified sheet) (YES in ACT3) and it is determined in ACT5 that the target job corresponds to a large-volume print job (YES in ACT5), the processing of the processor 1041 proceeds to ACT8. In other words, for example, if the width of the sheet to be used in the direction perpendicular to the conveyance direction is narrower than the specified width and if the total number of print sheets is larger than the specified number, the processing of the processor 1041 proceeds to ACT8. In ACT8, the processor 1041 instructs the printer controller 81 to change the settings of the control temperature and the print speed. For example, the processor 1041 instructs the printer controller 81 to change the control temperature to an increased temperature (first candidate temperature) that is determined to be higher than the standard temperature (second candidate temperature). The processor 1041 also instructs the printer controller 81 to change the print speed to a reduced speed determined to be lower than the standard speed (second candidate speed). The increased temperature and the reduced speed may be appropriately determined by, for example, the designer of the MFP 100 on the basis of experiments, simulations, empirical rules, and the like. Note that it is desirable that the increased temperature be a temperature reduced to the extent that the temperature difference of the press roller 33 in the longitudinal direction does not cause a fixing failure. Further, it is desirable that the increased temperature be determined to the extent that deformation or the like does not occur in various elements that cause a temperature change due to heat generation of the heater 32. It is also desirable that the reduced speed be determined such that the amount of reduction relative to the standard speed is kept to a necessary minimum in order to minimize the decrease in productivity. Note that, for example, as described above, if the standard temperature is changed in accordance with a printing condition, the increased temperature is set to a temperature higher than any of the plurality of standard temperatures. Thus, when the processor 1041 executes information processing based on the information processing program, the computer including the processor 1041 as the central portion functions as the setting unit.

In ACT3, the processor 1041 instructs the printer controller 81 to start printing of the target job on the basis of the captured print data (see ACT1). In response to such an instruction from the system controller 104, the printer controller 81 operates each unit to print the document represented by the print data on the print sheet. This operation may be similar to the operation performed by a well-known printer, for example. However, the printer controller instructs the fixing controller 85 to set the control temperature in the fixing unit 3 to the increased temperature (first candidate temperature). The printer controller 81 also instructs the forming controller 82, the exposure controller 83, the inversion controller 86, and the motor controller 87 to set the print speed to the reduced speed (first candidate speed).

In ACT10, the processor 1041 waits for completion of printing, which has been instructed to start (see ACT3), by determining whether or not the completion of printing of the target job has been notified from the printer controller 81. If it is determined that the completion of printing of the target job has been notified from the printer controller 81 (YES in ACT10), the processing of the processor 1041 proceeds to ACT11. In ACT11, the processor 1041 instructs the printer controller 81 to restore the changed settings (see ACT8). The processor 1041 instructs the printer controller 81 to restore, for example, the control temperature and the print speed to the standard temperature and the standard speed. The processor 1041 then terminates the print control processing shown in FIG. 4. As described above, in the MFP 100, in a large-volume successive printing using narrow print sheets, the control temperature is set to the increased temperature (first candidate temperature), and the print speed is set to the reduced speed (first candidate speed).

Figure 7:
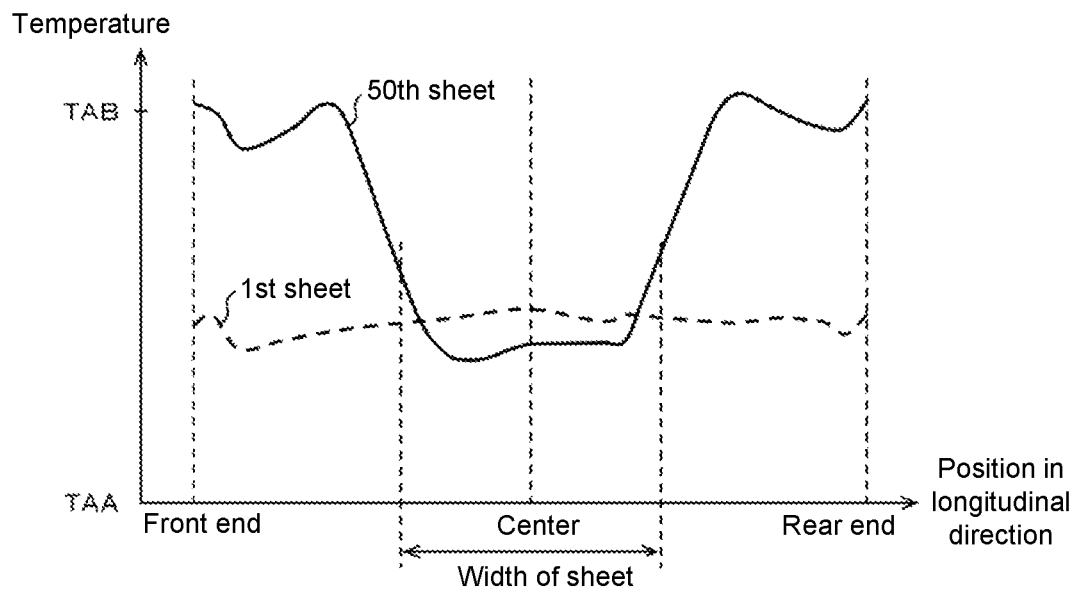
FIG. 7 is a diagram showing the results obtained by measuring the temperature of a fixing belt according to the embodiment at a plurality of positions of the fixing belt in the longitudinal direction.
Figure 8:
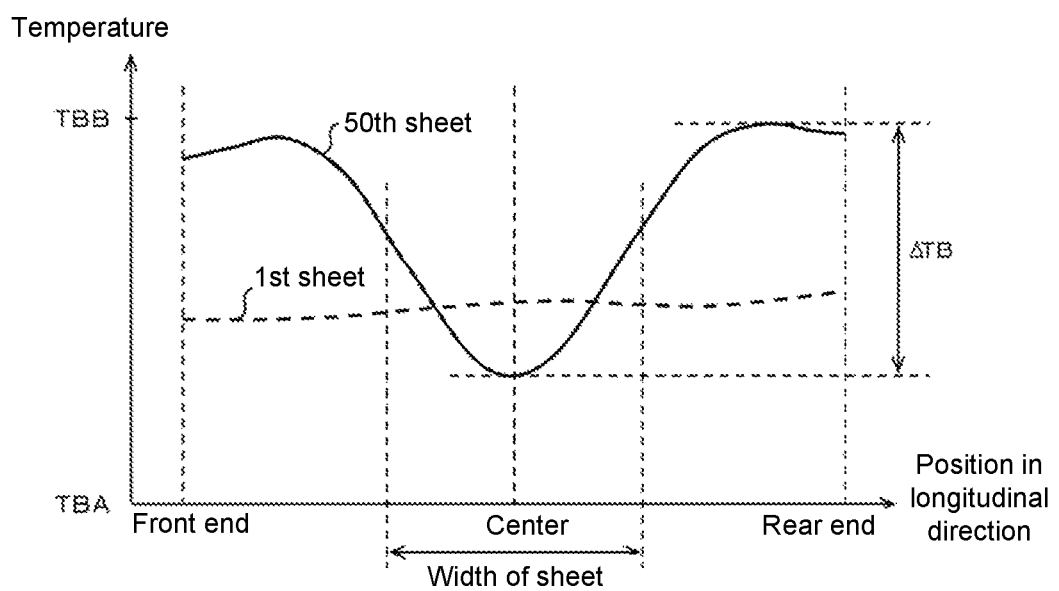
FIG. 8 is a diagram showing the results obtained by measuring the temperature of a press roller according to the embodiment at a plurality of positions of the press roller in the longitudinal direction.

FIG. 7 is a diagram showing the results obtained by measuring the temperature of the fixing belt 30 at a plurality of positions in the longitudinal direction of the fixing belt 30. The vertical axis of FIG. 7 represents the temperature of the fixing belt 30. The horizontal axis of FIG. 7 represents the position in the longitudinal direction of the fixing belt 30. The "front end" in the horizontal axis of FIG. 7 represents a position on one end side of the fixing belt 30 in the longitudinal direction, e.g., a position of the end on the near side of FIG. 1. Further, the "center" in the horizontal axis of FIG. 7 represents a position of the center portion of the fixing belt 30 in the longitudinal direction. Further, the "rear end" in the horizontal axis of FIG. 7 represents a position on the other end side of the fixing belt 30 in the longitudinal direction, e.g., a position of the end on the depth side in FIG. 1. FIG. 8 is a diagram showing the results obtained by measuring the temperature of the press roller 33 at a plurality of positions in the longitudinal direction of the press roller 33. The vertical axis of FIG. 8 represents the temperature of the press roller 33. The horizontal axis of FIG. 8 represents the position in the longitudinal direction of the press roller 33. The "front end" in the horizontal axis of FIG. 8 represents a position on one end side of the press roller 33 in the longitudinal direction, e.g., a position of the end on the near side of FIG. 1. Further, the "center" in the horizontal axis of FIG. 8 represents a position of the center portion of the press roller 33 in the longitudinal direction. Further, the "rear end" in the horizontal axis of FIG. 8 represents a position on the other end side of the press roller 33 in the longitudinal direction, e.g., a position of the end on the depth side in FIG. 1. Further, "ATB" in FIG. 8 represents the maximum temperature difference of the press roller 33. FIGS. 7 and 8 show the results of the temperature measurement at the time of printing in the same job. FIGS. 7 and 8 show the same measurement conditions as in FIGS. 5 and 6 except that the control temperature and the print speed are changed to the increased temperature and the reduced speed.

The maximum temperature difference of the press roller 33 in the 50th sheet, ATB in FIG. 8, is reduced as compared with ΔTA in FIG. 6. Therefore, the outer diameter difference corresponding to the position of the press roller 33 in the longitudinal direction is suppressed to be small as compared with the case where the control temperature and the print speed are set to the standard temperature and the standard speed without change.

Figure 9:
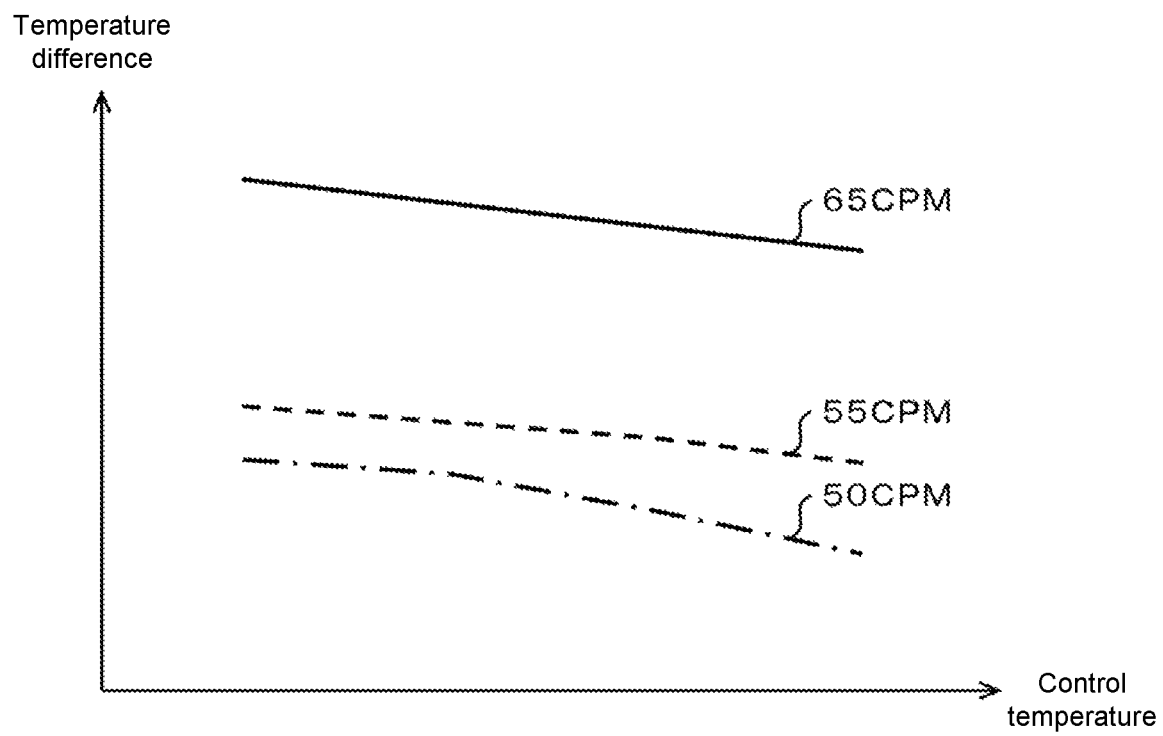
FIG. 9 is a diagram showing the relationship between the control temperature and print speed, and a temperature difference corresponding to a position of the press roller in the longitudinal direction shown in FIG. 1 according to the embodiment.

FIG. 9 is a diagram showing the relationship between the control temperature and print speed, and the temperature difference corresponding to the position of the press roller 33 in the longitudinal direction. FIG. 9 shows the cases where the print speeds are 65 CPM, 55 CPM, and 50 CPM. It can be seen from FIG. 9 that the temperature difference tends to be smaller as the control temperature becomes higher and as the print speed becomes slower. As a result, the temperature difference ΔTB (see FIG. 8) is reduced as compared with the temperature difference ΔTA (see FIG. 6) as described above.

Figure 10:
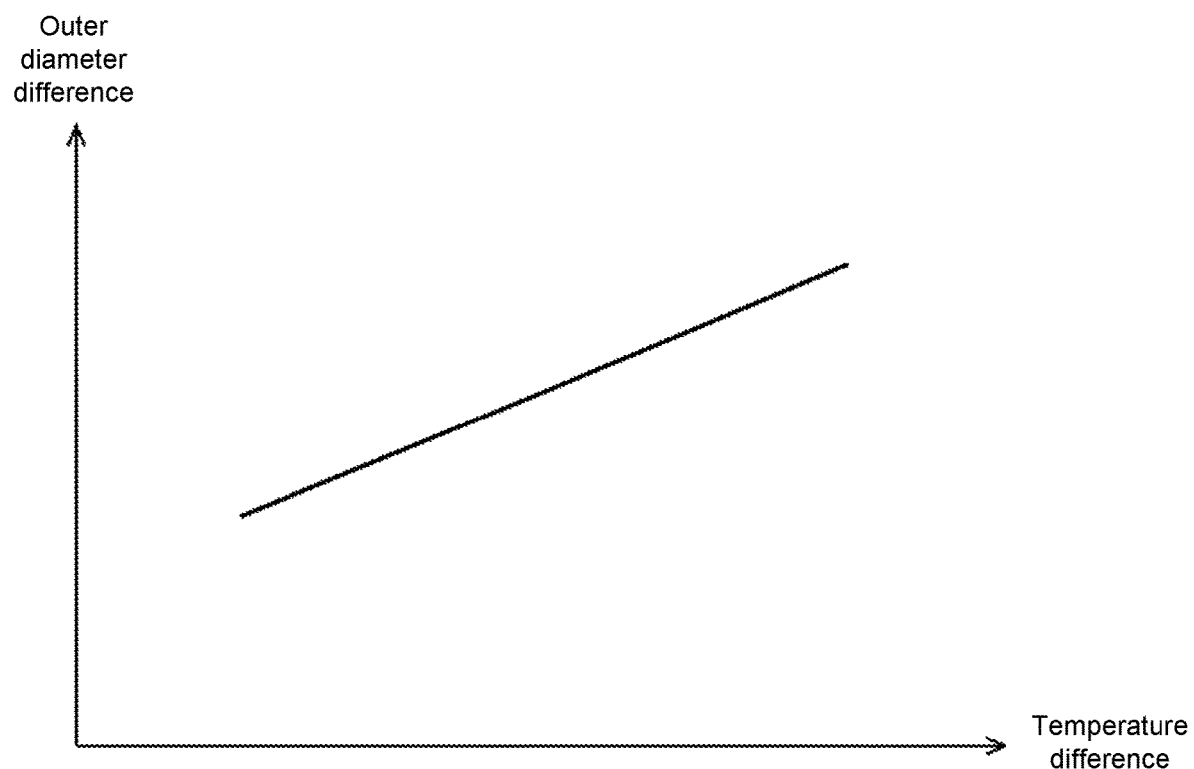
FIG. 10 is a diagram showing the relationship between the temperature difference and an outer diameter difference corresponding to the position of the press roller in the longitudinal direction according to the embodiment.

FIG. 10 is a diagram showing the relationship between the temperature difference and the outer diameter difference corresponding to the position of the press roller 33 in the longitudinal direction. It can be seen from FIG. 10 that the outer diameter difference tends to be smaller as the temperature difference becomes smaller. Therefore, the temperature difference ΔTA (see FIG. 6) is reduced as described above, and thus the outer diameter difference corresponding to the position of the press roller 33 in the longitudinal direction is suppressed to be small. In such a manner, according to the MFP 100, the variation in the pressing force corresponding to the position of the press roller 33 in the longitudinal direction is reduced, and the possibility that a fixing failure occurs can be reduced.

In addition, the MFP 100 does not slow down the print speed if the print sheet used is not a small-width sheet or if it does not perform a large-volume print job. Therefore, the slowdown of the print speed is limited to some jobs and the decrease in productivity is suppressed to a small level.

In addition, if the control temperature and the print speed are set to the increased temperature and the reduced speed prior to the start of printing of one job, the MFP 100 maintains the control temperature and the print speed at the increased temperature and the reduced speed until the printing of the job is completed. Therefore, it is possible to reduce the possibility that a fixing failure occurs in all printing of the corresponding job.

Figure 11:
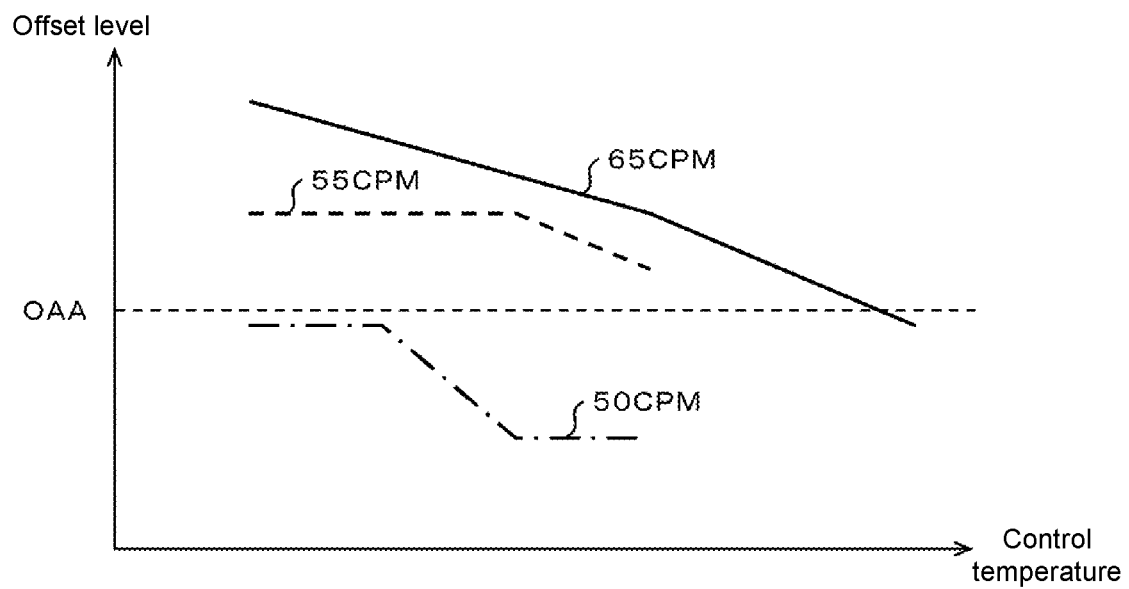
FIG. 11 is a diagram showing the relationship between the control temperature and print speed and an offset level according to the embodiment.

FIG. 11 is a diagram showing the relationship between the control temperature and print speed, and the offset level. FIG. 11 shows the cases where the print speeds are 65 CPM, 55 CPM, and 50 CPM. It can be seen from FIG. 11 that the offset level tends to be reduced if the control temperature is increased or the print speed is lowered. Note that the offset level is a level obtained by visually evaluating the effect on the image quality of the residual image, which is caused when a developer adhering to the fixing belt 30 from the print sheet adheres again to the print sheet. For example, if the offset level is equal to or less than "OAA", and if the residual image falls within an allowable level, it is effective to set the print speed to be equal to or less than 50 CPM.

This embodiment can be variously modified as follows. The processor 1041 may instruct the printer controller 81 to change only the setting of the control temperature in ACT8 of FIG. 4. In other words, the print speed may be the standard speed as it is.

In some circumstances, the processor 1041 may change at least one of the control temperature or the print speed until the completion of printing is confirmed in ACT10 after instructing the start of printing in ACT3 of FIG. 4.

The print control processing may be performed by a processor of the printer controller 81.

The fixing unit 3 may be changed to have any configuration as long as it has a function of heating and pressing the sheet, such as using a roller instead of the fixing belt 30 or, conversely, using a belt instead of the press roller 33.

Some or all of the functions implemented by the information processing by the processor 1041 can also be implemented by hardware such as a logic circuit that executes information processing not based on a program. Further, each of the functions described above can also be implemented by combining software control with hardware such as the logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, which forms an image on a sheet and fixes the formed image onto the sheet to perform image formation, comprising:
   a heater that generates heat to heat the sheet over an entire region in a direction perpendicular to a conveyance direction of the sheet to fix the image onto the sheet conveyed after the image is formed on the sheet;
   a pressing member that applies a pressure for fixing to the sheet heated by the heater over the entire region in the direction perpendicular to the conveyance direction;
   a temperature sensor that measures a temperature of the pressing member or a temperature near the pressing member;
   a controller that controls heat generation of the heater such that the temperature measured by the temperature sensor approaches a control temperature; and
   a processor that
      determines whether or not a sheet to be used in image formation of one job including the image formation is a specified sheet in which a width in the direction perpendicular to the conveyance direction is narrower than a specified width,
      determines whether or not the one job is a large-volume job in which a number of sheets to be used is larger than a specified number of sheets if the sheet to be used is the specified sheet, and
      sets, before starting the image formation of the one job, one candidate temperature of a plurality of predetermined candidate temperatures different from each other as the control temperature,
      the one candidate temperature being a first candidate temperature if the one job is the large-volume job, and being a second candidate temperature lower than the first candidate temperature if the sheet to be used is not the specified sheet and if the one job is not the large-volume job.

2. The image forming apparatus according to claim 1, wherein
the processor further sets an image forming speed corresponding to the one candidate temperature set as the control temperature.

3. The image forming apparatus according to claim 1, wherein
the processor maintains the control temperature set before starting the image formation of the one job until the one job is completed.

4. The image forming apparatus according to claim 1, wherein
the processor sets, before starting the image formation of the one job, one candidate speed of a plurality of predetermined candidate speeds different from each other as an image forming speed on a basis of the number of sheets to be used and a sheet size to be used in the image formation of the one job.

5. The image forming apparatus according to claim 4, wherein
the processor sets, if a width of the sheet to be used in the direction perpendicular to the conveyance direction is narrower than a predetermined specified width and if the number of sheets to be used in the image formation of the one job including the image formation is larger than a predetermined specified number of sheets, a first candidate speed slower than the image forming speed in a case other than the above cases as the image forming speed.

6. The image forming apparatus according to claim 1, wherein
the pressing member includes
a fixing belt, and
another member that is different from the fixing belt and sandwiches the sheet together with the fixing belt, and
the temperature sensor measures a temperature of the fixing belt.

7. The image forming apparatus according to claim 6, wherein
the pressing member includes
a press roller that is provided as the other member to face the fixing belt and sandwiches the sheet together with the fixing belt, and
a pressing pad that presses the fixing belt to the press roller, and
the temperature sensor is provided to a surface side opposite to a surface of the fixing belt facing the press roller and measures a temperature of the fixing belt in a vicinity of a position facing the press roller.

8. The image forming apparatus according to claim 1, wherein
the processor
sets, before starting the image formation of the one job, one candidate speed of a plurality of predetermined candidate speeds different from each other as an image forming speed,
the image forming speed being a first candidate speed if the one job is the large-volume job, and a second candidate speed faster than the first candidate speed if the sheet to be used is not the specified sheet and if the one job is not the large-volume job.

9. An image forming apparatus, which forms an image on a sheet and fixes the formed image onto the sheet to perform image formation, comprising:
a heater that generates heat to heat the sheet over an entire region in a direction perpendicular to a conveyance direction of the sheet to fix the image onto the sheet conveyed after the image is formed on the sheet;
a pressing member that applies a pressure for fixing to the sheet heated by the heater over the entire region in the direction perpendicular to the conveyance direction;
a temperature sensor that measures a temperature of the pressing member or a temperature near the pressing member;
a controller that controls heat generation of the heater such that the temperature measured by the temperature sensor approaches a control temperature; and
a processor that
determines whether or not a sheet to be used in image formation of one job including the image formation is a specified sheet in which a width in the direction perpendicular to the conveyance direction is narrower than a specified width,
determines whether or not the one job is a large-volume job in which a number of sheets to be used is larger than a specified number of sheets if the sheet to be used is the specified sheet, and
sets, before starting the image formation of the one job, one candidate temperature of a plurality of predetermined candidate temperatures different from each other as the control temperature and one candidate speed of a plurality of predetermined candidate speeds different from each other as an image forming speed,
the image forming speed being a first candidate speed if the one job is the large-volume job, and a second candidate speed faster than the first candidate speed if the sheet to be used is not the specified sheet and if the one job is not the large-volume job.

10. The image forming apparatus according to claim 9, wherein
the processor maintains the control temperature set before starting the image formation of the one job until the one job is completed.

11. The image forming apparatus according to claim 9, wherein
the pressing member includes
a fixing belt, and
another member that is different from the fixing belt and sandwiches the sheet together with the fixing belt, and
the temperature sensor measures a temperature of the fixing belt.

12. The image forming apparatus according to claim 11, wherein
the pressing member includes
a press roller that is provided as the other member to face the fixing belt and sandwiches the sheet together with the fixing belt, and
a pressing pad that presses the fixing belt to the press roller, and
the temperature sensor is provided to a surface side opposite to a surface of the fixing belt facing the press roller and measures a temperature of the fixing belt in a vicinity of a position facing the press roller.

* * * * *